(12) United States Patent
Kaufman

(10) Patent No.: US 11,683,086 B2
(45) Date of Patent: *Jun. 20, 2023

(54) BEAM PLACEMENT METHODS, SYSTEMS, AND COMPUTER PROGRAM PRODUCTS

(71) Applicant: SES S.A., Betzdorf (LU)

(72) Inventor: David Kaufman, Oakton, VA (US)

(73) Assignee: SES S.A., Betzdorf (LU)

(*) Notice: Subject to any disclaimer, the term of this patent is extended or adjusted under 35 U.S.C. 154(b) by 0 days.

This patent is subject to a terminal disclaimer.

(21) Appl. No.: 17/693,163

(22) Filed: Mar. 11, 2022

(65) Prior Publication Data

US 2022/0200692 A1 Jun. 23, 2022

Related U.S. Application Data

(63) Continuation of application No. 17/095,454, filed on Nov. 11, 2020, now Pat. No. 11,336,363.

(60) Provisional application No. 62/966,990, filed on Jan. 28, 2020.

(51) Int. Cl.
*H04W 40/02* (2009.01)
*H04B 7/185* (2006.01)
*H04W 16/28* (2009.01)

(52) U.S. Cl.
CPC ........ *H04B 7/18508* (2013.01); *H04W 16/28* (2013.01)

(58) Field of Classification Search
CPC ............................... H04W 40/02; H04B 7/185
See application file for complete search history.

(56) References Cited

U.S. PATENT DOCUMENTS

| 11,252,723 B1* | 2/2022 | Lu ........................... H04L 41/16 |
| 2021/0112238 A1 | 4/2021 | Bylicka et al. |
| 2023/0034433 A1* | 2/2023 | Zorgui ...................... G01S 5/02 |

FOREIGN PATENT DOCUMENTS

| WO | WO 2005/045424 A2 | 5/2005 |
| WO | WO2017013698 A1 | 1/2017 |
| WO | WO 2020/051685 A1 | 3/2020 |

OTHER PUBLICATIONS

Rao, Sudhakar K, "Design and analysis of multiple-beam reflector antennas", IEEE Antennas and Propagation Magazine, vol. 41, No. 4, Aug. 1999, pp. 53-59.

(Continued)

*Primary Examiner* — Sulaiman Nooristany
(74) *Attorney, Agent, or Firm* — Morgan, Lewis & Bockius LLP

(57) ABSTRACT

A method, carried out by a processing device(s), is used for assisting in placing beams to cover a plurality of locations on Earth. The method comprises: grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam; assigning a beam to each of at least some of the cliques; and outputting parameters usable to control at least one beam source to form the assigned beams. The invention also relates to a system, computer program products, and a method and system for simulating a beam placement.

28 Claims, 11 Drawing Sheets

(56) References Cited

OTHER PUBLICATIONS

R. F. E. Guy, C. B. Wyllie, and J. R. Brain, "Synthesis of the Inmarsat 4 multibeam mobile antenna," in Proc. of 12th International Conference on Antennas and Propagation, vol. 1, Exeter, UK, Apr. 2003, pp. 90-93.
P. K. Bailleul, "A new era in elemental digital beamforming for spaceborne communications phased arrays," Proc. IEEE, vol. 104, No. 3, pp. 623-632, Mar. 2016.
Bron C. and Kerbosch J., "Algorithm 457: finding all cliques of an undirected graph," Commun. ACM, 16(9) (Sep. 1973), 575-577.
"Bron-Kerbosch algorithm," Wikipedia, The Free Encyclopedia, https://en.wikipedia.org/w/index.php?title=Bron%E2%80%93Kerbosch_algorithm&oldid=931675450 (accessed Jan. 13, 2020).
Tomita E., et al, "The worst-case time complexity for generating all maximal cliques and computational experiments", Theor. Comput. Sci., 363(1):28-42, 2006.
Akkoyunlu E. A., "The Enumeration of Maximal Cliques of Large Graphs", Siam J. Comput. 2, 1-6, 1973.
Radio Regulations, Edition of 2016, ITU, Geneva, 2016, Section IV—Radio stations and systems, Article 1.66A.
Camino, Jean-Thomas, et al. "Mixed-integer linear programming for multibeam satellite systems design: Application to the beam layout optimization." 2016 Annual IEEE Systems Conference (SysCon). IEEE, 2016.
Camino, Jean-Thomas, et al. "Linearization of Euclidean norm dependent inequalities applied to multibeam satellites design." Computational Optimization and Applications 73.2 (2019): 679-705.
JP Choffray, "New Generation of Digitally Beamformed MEO and GEO—System Perspective", apparently corresponding to a keynote given at 9th Advanced Satellite Multimedia Systems Conference and the 15th Signal Processing for Space Communications Workshop, ASMS/SPSC 2018, Berlin, Germany, Sep. 10-12, 2018. IEEE 2018, ISBN 978-1-5386-6035-5.
Extended European Search Report, Application No. 20205127.2, May 6, 2021, 8 pgs.
Jahn, Resource Management Techniques Applied to Satellite Communications Networks, German Aerospace Center (DLR), Inst. for Communications Technology, Feb. 17, 1998, 8 pgs.
Galtier, Real-Time Resource Allocation for LEO Satellite Constellations, Wireless Netw (2009), published online: Nov. 27, 2007, 13 pgs.
Ji, Graph Based User Clustering for HAP Massive MIMO Systems with Two-Stage Beamforming, Dept. of Electronic Engineering, 2019, 6 pgs.
Kaufman, Notice of Allowance, U.S. Appl. No. 17/095,454, 18 pgs.
SES S.A., EP20205127.2, European Office Action, dated Apr. 14, 2023, 4 pgs.
Arum et al., "Beam-Pointing Algorithm for Contiguous High-Altitude Platform Cell Formation for Extended Coverage", Department of Electronic Engineering, University of York, York; United Kingdom Faculty of Informatics and Computing, Universiti Sultan Zainal Abidin, Malaysia, Published in 2019 IEEE 90th Vehicular Technology Conference (VTC2019-Fall), Date of Conference: Sep. 22-25, 2019, 5 pgs.
Pachler de la Osa et al., "Static beam placement and frequency plan algorithms for LEO constellations", International Journal of Satellite Communications and Networking 39(1) 2020; Aug. 1-13, 2020, 13 pgs. DOI:10.1002/sat.1345.

* cited by examiner

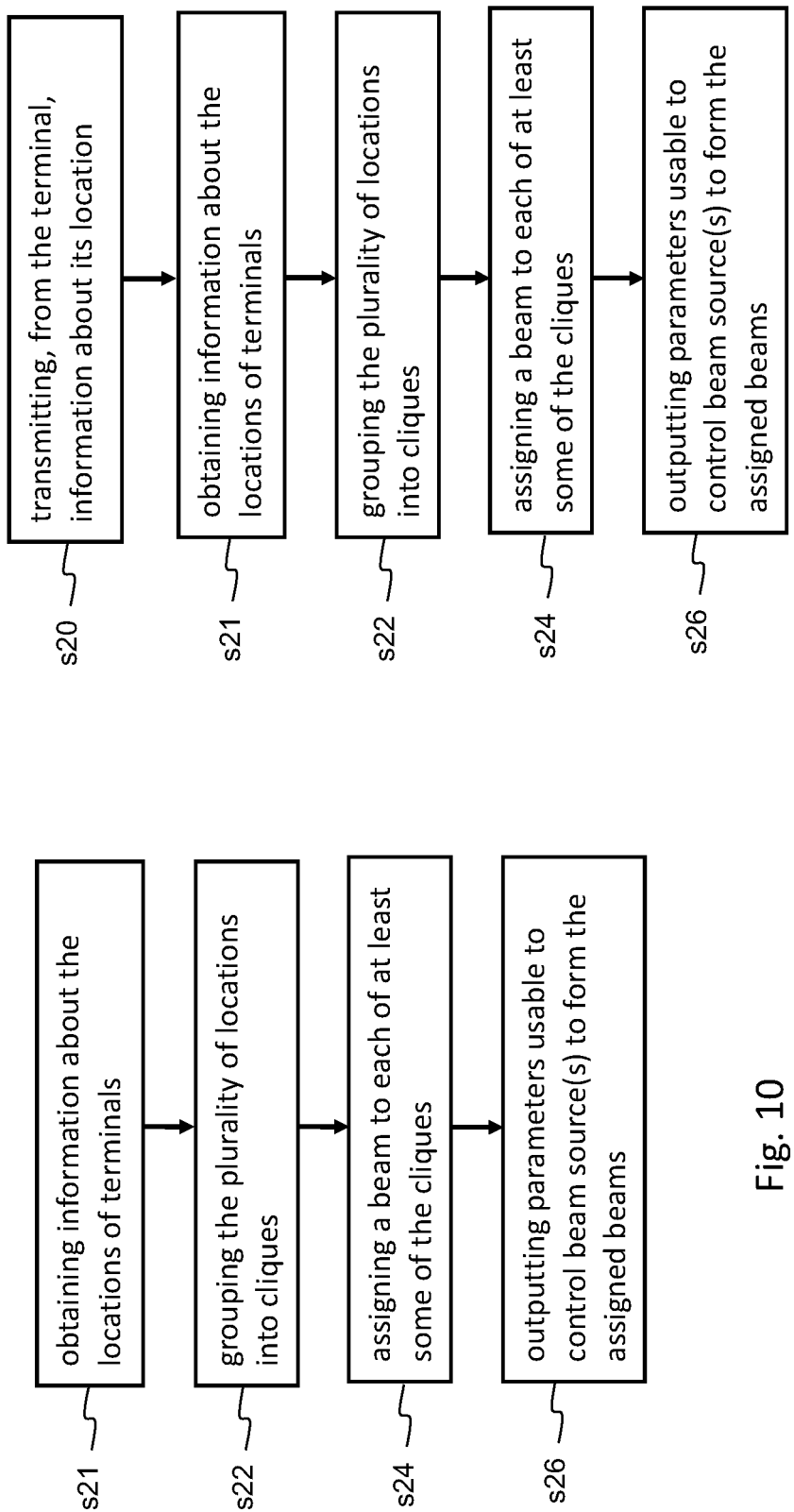

BEAM PLACEMENT METHODS, SYSTEMS, AND COMPUTER PROGRAM PRODUCTS

RELATED APPLICATIONS

This application is a continuation application of U.S. patent application Ser. No. 17/095,454, filed Nov. 11, 2020, which claims the benefit of, and priority to, U.S. Provisional Application Ser. No. 62/966,990, filed Jan. 28, 2020. The content of U.S. patent application Ser. No. 17/095,454, filed Nov. 11, 2020, is incorporated by reference herein in its entirety.

FIELD OF TECHNOLOGY

The invention relates to methods and systems for assisting in placing beams, also called "coverage beams", to cover a plurality of locations on Earth. The invention may be used to, though not limited to, assist in providing broadband communications, such as internet connectivity to a plurality of terminals.

BACKGROUND

A beam formed with a directional antenna or antenna array arranged on a satellite orbiting the Earth typically covers a region, also called "coverage area", on Earth, thus enabling terminals located within said region to communicate through the satellite with, for example, a remote ground station.

Statically placing beams to cover a plurality of fixed regions on Earth may turn out to be inefficient because, if terminals are moving and roaming across beams, no terminal or very few terminals may be located at one point in time in a given region covered by a beam. Further, the number of available beams may be insufficient to cover all the regions through which the terminals may move.

An alternative beam placement technique is a "follow the remote" configuration wherein a single beam is dedicated to a single terminal and the beam's center is updated to match the terminal's location. This technique may, however, also lead to an inefficient use of bandwidth as some terminals may merely consume a fraction of the full capacity of a beam.

In view of the above, there is a need for solutions to assist in efficiently placing beams to cover a plurality of locations on Earth, in particular, but not only, locations corresponding to terminals on ships or aircraft, i.e. mobile terminals.

SUMMARY

The present invention aims at addressing, at least partially, the above-mentioned need. The invention includes methods, systems, computer programs, computer program products, and computer-readable storage mediums as defined in the independent claims. Particular embodiments are defined in the dependent claims.

In one embodiment, a method, carried out by a processing device or a set of processing devices, is provided for assisting in placing beams to cover a plurality of locations on Earth. The method comprises: grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam; assigning a beam to each of at least some of the cliques; and outputting parameters usable to control at least one beam source to form the assigned beams.

The method assists in efficiently placing beams to cover a plurality of locations on Earth by outputting parameters usable by a beam source or a plurality of beam sources to form beams. In particular, the method results in a beam layout generally minimizing the number of beams needed to cover the plurality of locations. Further, the method generally enables that goal to be reached in a computationally efficient way, and thus in a feasible way, even with a large number of locations—and correspondingly a large number of terminals—, or with a large number of resulting beams, or with both.

The invention also relates to a system for carrying out the above-described method, to a computer program or set of computer programs comprising computer-readable instructions for carrying out the above-described method, and to related computer program products and computer-readable storage mediums.

In one embodiment, a method as described above is provided comprising, instead of, or in addition to, outputting parameters usable to control beam source(s) to form beams, simulating a beam placement in accordance with assigned beams. The method in this embodiment therefore assists in efficiently simulating a beam placement to cover a plurality of locations on Earth for example to validate the addition of new locations corresponding to new terminals, changing the bandwidth associated with some terminals, etc. The simulation relies on a beam layout generation process generally minimizing the number of beams needed to cover the plurality of locations. Further, that goal is generally reached in a computationally efficient way, and thus in a feasible way, even with many locations—and correspondingly many terminals—, or with many beams, or with both.

The invention also relates to a system for carrying out the above-described method comprising a beam placement simulation, to a computer program or set of computer programs comprising computer-readable instructions for carrying out the above-described method comprising a beam placement simulation, and to related computer program products and computer-readable storage mediums.

BRIEF DESCRIPTION OF THE DRAWINGS

FIG. 10 is a flowchart of a method in one embodiment of the invention, further comprising obtaining information about the locations of terminals;

FIG. 11 is a flowchart of a method in one embodiment of the invention, further comprising a terminal transmitting information about its location;

DETAILED DESCRIPTION

The present invention shall now be described in conjunction with specific embodiments. The specific embodiments serve to provide the skilled person with a better understanding but are not intended to in any way restrict the scope of the invention, which is defined by appended claims. In particular, the embodiments described independently throughout the description can be combined to form further embodiments to the extent that they are not mutually exclusive. A list of abbreviations and their meaning is provided at the end of the detailed description.

When the term "real-time" is used in the present document, it means that there is an action (e.g., data is processed, results are computed) as soon as the required information for that action is available. Thus, certain latency may exist, which depends on various aspects depending on the involved component(s) of the system.

Figure 1:
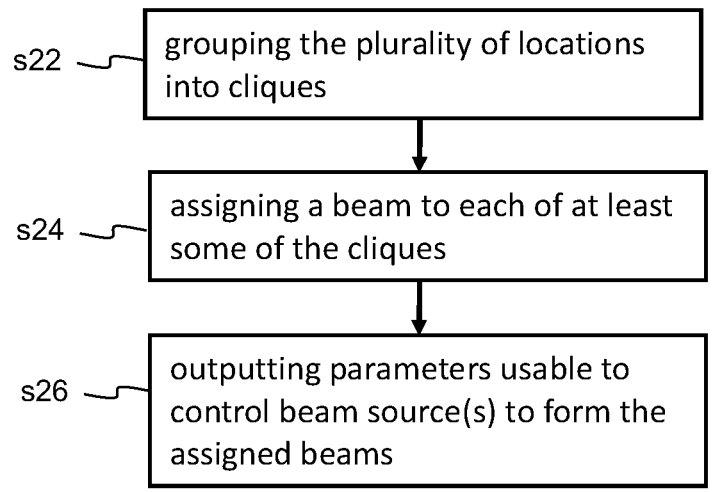
FIG. 1 is a flowchart of a method in one embodiment of the invention.

FIG. 1 is a flowchart of a method in one embodiment of the invention. The method is carried out by a processing device or by a set of such devices. The method may be carried out by any suitable processing device or any suitable combination of processing devices, wherein a processing device may as well perform other functions than those associated with the method. A processing device may for example be: a computer, a microprocessor, a microcontroller-based platform, an integrated circuit, or an application-specific integrated circuit (ASIC). The method may additionally comprise steps or operations carried out partially or fully by other suitable elements, such as an antenna for receiving or transmitting an electromagnetic signal.

The method's purpose is to assist in placing beams 10 to cover a plurality of locations 12 on Earth 14. By 'assisting in placing beams', it is meant that the method leads to outputting parameters usable to control one or more beam source to form the beams and/or leads to forming the beams.

A beam, also called "coverage beam" or, when relatively small, "spot beam", aims at covering a region on Earth. It is formed with a directional antenna or antenna array arranged on a beam source. Namely, the beam results from the radiation pattern emitted by the antenna or antenna array. A radiation pattern typically comprises a main lobe plus various sidelobes. A beam directed towards Earth may be represented on the Earth's surface by a disk, an elliptic region, or a similarly-shaped region corresponding to the region of the Earth's surface where the antenna gain decrease relative to the peak gain is smaller than a reference gain decrease value, the reference gain decrease value being for example 3 dB. That is, the antenna gain decrease at the beam edge is 3 dB relative to the peak gain. The invention is not limited, however, to a specific reference gain decrease value. Other reference gain decrease values may be used to define the beam's footprint on Earth. A location on Earth may therefore be said to be covered by a beam when it is within the beam's footprint on Earth, as discussed above.

In one embodiment, assisting in placing beams may therefore be regarded as determining a beam layout, and the parameters that the method outputs may be representative of that beam layout.

The coordinates of the plurality of locations constitute an input to the method. A location may correspond to a location of a terminal on the Earth's surface, or to the projection, e.g. vertically, on the Earth of the location of a terminal near the Earth's surface. By "near the Earth's surface", it is meant below a threshold altitude from the Earth's surface. In one embodiment, the threshold altitude is an altitude equal to or smaller than at least one of: 10000, 12000, 15000, 20000, 25000, and 30000 meters above sea level. The terminals are located at lower altitudes than those of the beam sources. The terminals may be fixed or mobile. Thus, the plurality of locations may correspondingly include both fixed and mobile terminals. A mobile terminal may for example be attached to a ship (such as a cruise ship or a cargo ship), an airplane (such as a passenger airliner), or a train.

In one embodiment, the number of locations is a number larger than at least one of: 5, 10, 20, 30, 50, 100, 200, 300, and 500. A beam may enable concurrent communications with several terminals at several locations. In that sense, the beam is a multi-tenant resource, i.e. the capacity of the beam may be shared among several terminals.

In step s22, the processing device(s) groups the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam.

A clique is a subset of vertices of an undirected graph such that all vertices in the clique are adjacent to each other. Two vertices are adjacent if they are connected by an edge. If two locations are regarded as coverable by a single beam, the vertices corresponding to these two locations are connected by an edge. A clique problem resolution technique (as will be discussed below) enables to find cliques within the undirected graph. Since all vertices in a clique are adjacent to each other, all locations corresponding to vertices in a clique are generally guaranteed to be coverable by a single beam, unless the locations corresponding to the vertices of the clique collectively do not meet some additional constraint associated with the beam source later assigned to form the beam. Examples of such constraints will be discussed below.

A beam is then assigned, in step s24, to each of at least some of the cliques. The center of a beam (corresponding to the pointing direction at one point in time) may be determined by computing the centroid of the vertices (corresponding to locations) of the clique. For example, for a finite set of locations $x_1, x_2, \ldots, x_k$ in $\mathbb{R}^2$, the centroid may be defined as $$C = \frac{x_1 + x_2 + \ldots + x_k}{k}$$

The diameter of the beam may then be chosen to cover all locations $x_1, x_2, \ldots, x_k$. Alternatively, an elliptic beam (or a similarly-shaped beam) may be selected if more appropriate in view of the distribution of locations $x_1, x_2, \ldots, x_k$, and if the beam source is capable of generating such an elliptic beam (or such a similarly-shaped beam).

In one embodiment, the beam center is determined by not only taking the coordinates of the vertices into account but also additional characteristics of the terminals corresponding to the vertices, such as for example the power requirements of the terminals. For example, if it is known that some of the terminals need more power, i.e. a higher carrier-to-noise ratio (C/N), than others, and if those terminals that need more power are on one side of the clique in terms of geography, the beam center may be slightly offset in the direction of the terminals that need more signal strength. This may for example be implemented by first calculating the centroid of the vertices of the clique (as explained above), and then fine-tuning the determination in a second stage of the process.

In one embodiment, in step s24, a subset of non-overlapping cliques among those found in step s22 is selected, and a beam is assigned to each of the cliques of the subset.

In step s26, parameters usable to control one or more beam source(s) to form the assigned beams are then outputted. In one embodiment, the parameters are indicative of the position and shape of each of the beams. In one embodiment, the parameters represent the center and diameter (or radius) of each of the beams.

Figure 4:
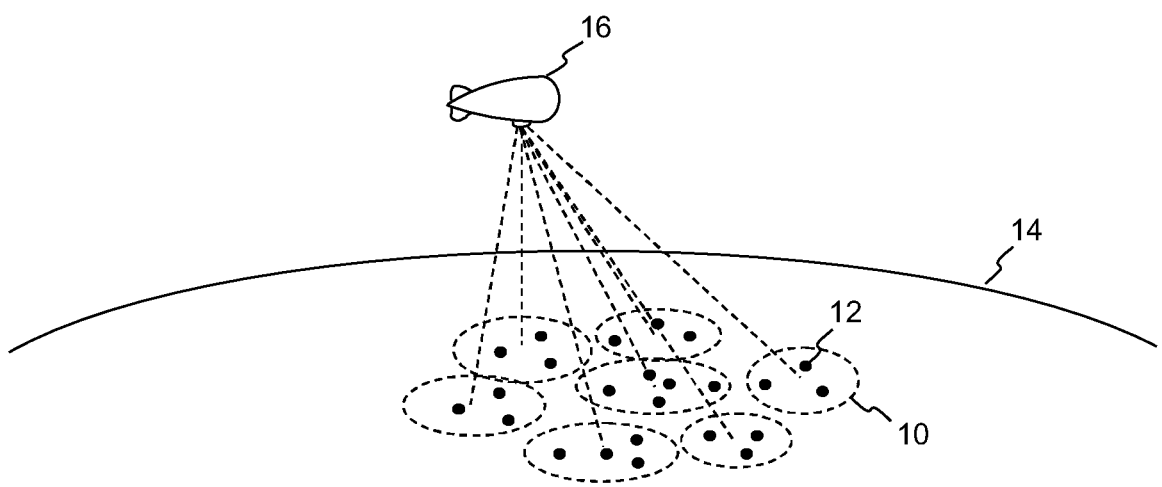
FIG. 4 schematically illustrates some aspects of a multi-beam aerostat communications method and system in one embodiment of the invention.

In one embodiment, the outputted parameters are usable to control a single beam source to form the assigned beams. In one sub-embodiment, schematically illustrated by FIG. 2, the beam source 16 is a multi-beam satellite, i.e. a satellite comprising one or more antennas or antenna arrays suitable for forming a plurality of beams 10. In another sub-embodiment, schematically illustrated by FIG. 4, the beam source 16 is a multi-beam aerostat, i.e. an aerostat comprising one or more antennas or antenna arrays suitable for forming a plurality of beams 10.

Figure 5:
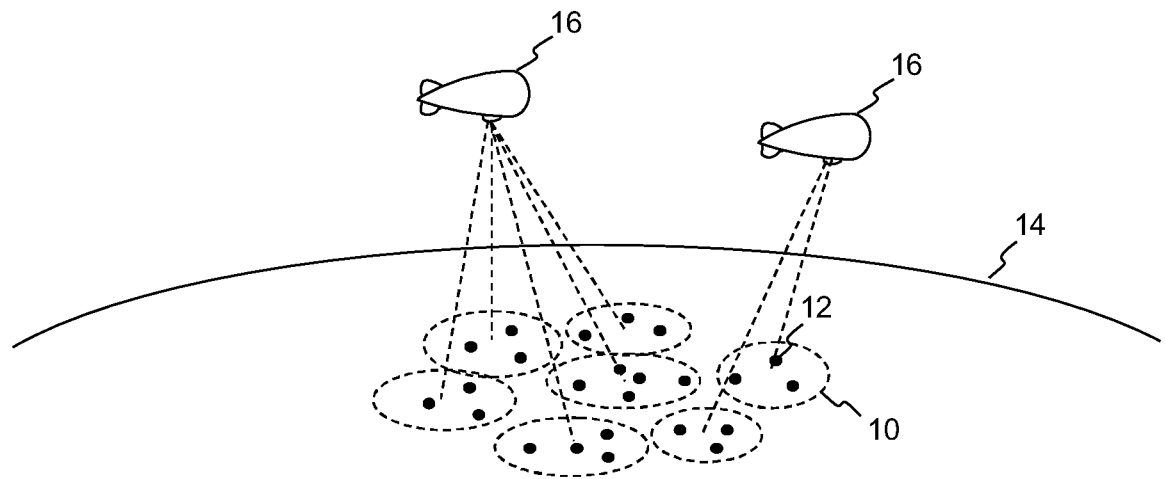
FIG. 5 schematically illustrates some aspects of a multi-beam aerostat communications method and system in one embodiment of the invention, wherein two aerostats are used to cover a plurality of locations on Earth.

In one embodiment, the outputted parameters are usable to control a plurality of beam sources to form the assigned beams. In one sub-embodiment, schematically illustrated by FIG. 3, each beam source 16 is a multi-beam satellite. In another sub-embodiment, schematically illustrated by FIG. 5, each beam source 16 is a multi-beam aerostat.

In one embodiment, each beam source 16 is a satellite, preferably selected from the group consisting of: a low Earth orbit (LEO) satellite, a medium Earth orbit (MEO) satellite, and a geosynchronous orbit (GSO) satellite (such as a geostationary satellite).

In one embodiment, each beam source 16 is an aircraft, preferably selected from the group consisting of: a high-altitude platform station (HAPS), a high-altitude long endurance (HALE) aircraft, an aerostat, a balloon, an airship, an airplane, an unmanned aerial vehicle, and a combination of any number among the above-mentioned elements. A HAPS is "a station on an object at an altitude of 20 to 50 km and at a specified, nominal, fixed point relative to the Earth" (Radio Regulations, Edition of 2016, ITU, Geneva, 2016, Section IV—Radio stations and systems, Article 1.66 A). A HALE aircraft is an aircraft typically operating at high altitude, such as between 12000 and 19000 meters, for long periods of time without landing, such as for more than 12 hours.

In one embodiment, each beam source 16 is a multibeam beam source, such as a multibeam satellite or multibeam aircraft. In one embodiment, each beam source 16 is a multibeam satellite capable of generating a number of beams, the number of beams being a number selected from at least one of the following ranges: 2 to 10000 beams, 10 to 8000 beams, and 15 to 6000 beams, such as for example 2, 4, 6, 8, 10, 12, 16, 18, 24, 48, 64, 100, 150, 200, 250, 300, 400, 800, 1200, or 5000 beams per satellite. Regarding the design and structure of multi-beam antennas and antenna arrays, see for example: (a) Rao, Sudhakar K, "Design and analysis of multiple-beam reflector antennas", *IEEE Antennas and Propagation Magazine*, vol. 41, no. 4, August 1999, pp. 53-59; (b) R. F. E. Guy, C. B. Wyllie, and J. R. Brain, "Synthesis of the Inmarsat 4 multibeam mobile antenna," in *Proc. of 12th International Conference on Antennas and Propagation*, vol. 1, Exeter, UK, April 2003, pp. 90-93; and (c) P. K. Bailleul, "A new era in elemental digital beam-forming for spaceborne communications phased arrays," *Proc. IEEE*, vol. 104, no. 3, pp. 623-632, March 2016. In one embodiment, at least some of the beams are steerable, i.e. with at least some controllable beamforming and pointing characteristics. For example, a multibeam satellite may carry a flat-panel, electrically-steered beam-forming phased array antenna, with every beam being independently steerable, shapeable, and power adjustable. Such antennas are typically flexible and software-controllable. In one embodiment, a multibeam satellite may not be able to activate all its beams simultaneously but may implement a time-domain beam hopping technique to allow the satellite to reach, in effect, a high or very high number of beams.

Using an undirected graph for describing, i.e. representing, a satellite capacity problem and then using a clique problem resolution technique to solve the satellite capacity problem are advantageous in terms of efficient beam placement and computational efficiency for determining a suitable beam placement layout.

Figure 6A:
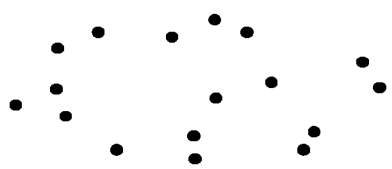
FIG. 6*a* schematically illustrates an example of a plurality of locations on Earth in one embodiment of the invention.
Figure 6B:
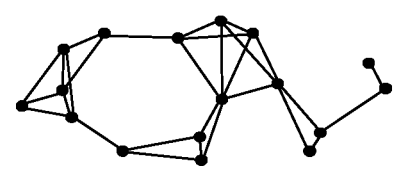
FIG. 6*b* schematically illustrates an undirected graph in one embodiment of the invention, wherein the vertices of the undirected graph correspond to the plurality of locations of FIG. 6*a*.
Figure 6C:
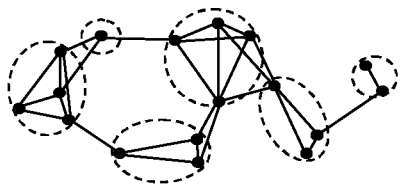
FIG. 6c schematically illustrates some exemplary cliques in one embodiment of the invention, obtained based on the undirected graph of FIG. 6b.
Figure 6D:
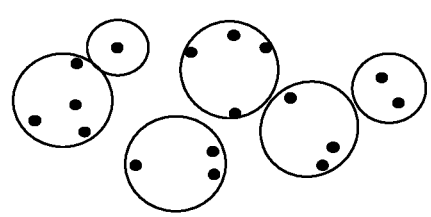
FIG. 6d schematically illustrates beams in one embodiment of the invention, wherein each beam corresponds to a clique of FIG. 6c.

FIG. 6a schematically illustrates an exemplary set of 17 locations on Earth in one embodiment of the invention. Each location is then considered to be a vertex of an undirected graph, and edges are added between each pair of vertices if the two locations corresponding to said pair of vertices are regarded as coverable by a single beam, as illustrated by FIG. 6b. This creates an undirected 17-vertex, 29-edge graph. In step s22, the locations are then grouped into cliques by applying a clique problem resolution technique. As an example, 6 cliques potentially resulting from applying a clique problem resolution technique to the undirected graph are illustrated in FIG. 6c: two of them are 4-vertex cliques, two are 3-vertex cliques, one is a 2-vertex clique, and one is a 1-vertex clique. In step s24, a beam is then assigned to each of the 6 cliques as illustrated in FIG. 6d, with a center and diameter covering the vertices of the clique under consideration.

Figure 7:
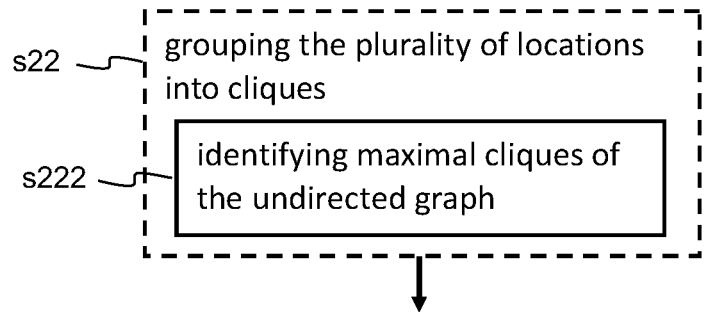
FIG. 7 is a flowchart of a portion of a method in one embodiment of the invention, in which grouping the plurality of locations into cliques by applying a clique problem resolution technique comprises identifying maximal cliques of the undirected graph.

FIG. 7 is a flowchart of a portion of method in one embodiment of the invention, wherein grouping, in step s22, the plurality of locations into cliques by applying a clique problem resolution technique comprises identifying s222 maximal cliques of the undirected graph. A maximal clique is a clique that cannot be extended by including an additional adjacent vertex. In one embodiment, identifying s222 maximal cliques of the undirected graph comprises identifying all maximal cliques of the undirected graph. In one embodiment, the clique problem resolution technique comprises a Bron-Kerbosch technique, i.e. a method based on the Bron-Kerbosch algorithm in its basic form (as described in Bron C. and Kerbosch J., "Algorithm 457: finding all cliques of an undirected graph," *Commun. ACM*, 16 (9) (September 1973), 575-577, in any of its two versions), or based on a variant thereof (see e.g. "Bron-Kerbosch algorithm," *Wikipedia, The Free Encyclopedia*, https://en.wikipedia.org/w/index.php?title=Bron%E2%80%93Kerbosch_algorithm&oldid=931675450 (accessed Jan. 13, 2020), describing variants of the Bron-Kerbosch algorithm). The Bron-Kerbosch algorithm is an efficient technique for identifying all maximal cliques in an undirected graph. Other techniques may also be used to find maximal cliques (see e.g. Tomita E., et al, "The worst-case time complexity for generating all maximal cliques and computational experiments", *Theor. Comput. Sci.*, 363 (1):28-42, 2006; Akkoyunlu E. A., "The Enumeration of Maximal Cliques of Large Graphs", *SIAM J. Comput.* 2, 1-6, 1973). The technique to find maximal cliques of the undirected graph may for example be based on a recursive backtracking algorithm.

In one embodiment, assigning, in step s24, a beam to each of at least some of the cliques comprises assigning a beam to each of at least some of the maximal cliques. In one embodiment, a subset of non-overlapping maximal cliques among those maximal cliques identified in step s222 is selected, and a beam is then assigned to each of the maximal cliques of the subset. Selecting non-overlapping maximal cliques is advantageous because assigning a location to a single beam generally suffices to serve the terminal corresponding to that location.

Figure 8:
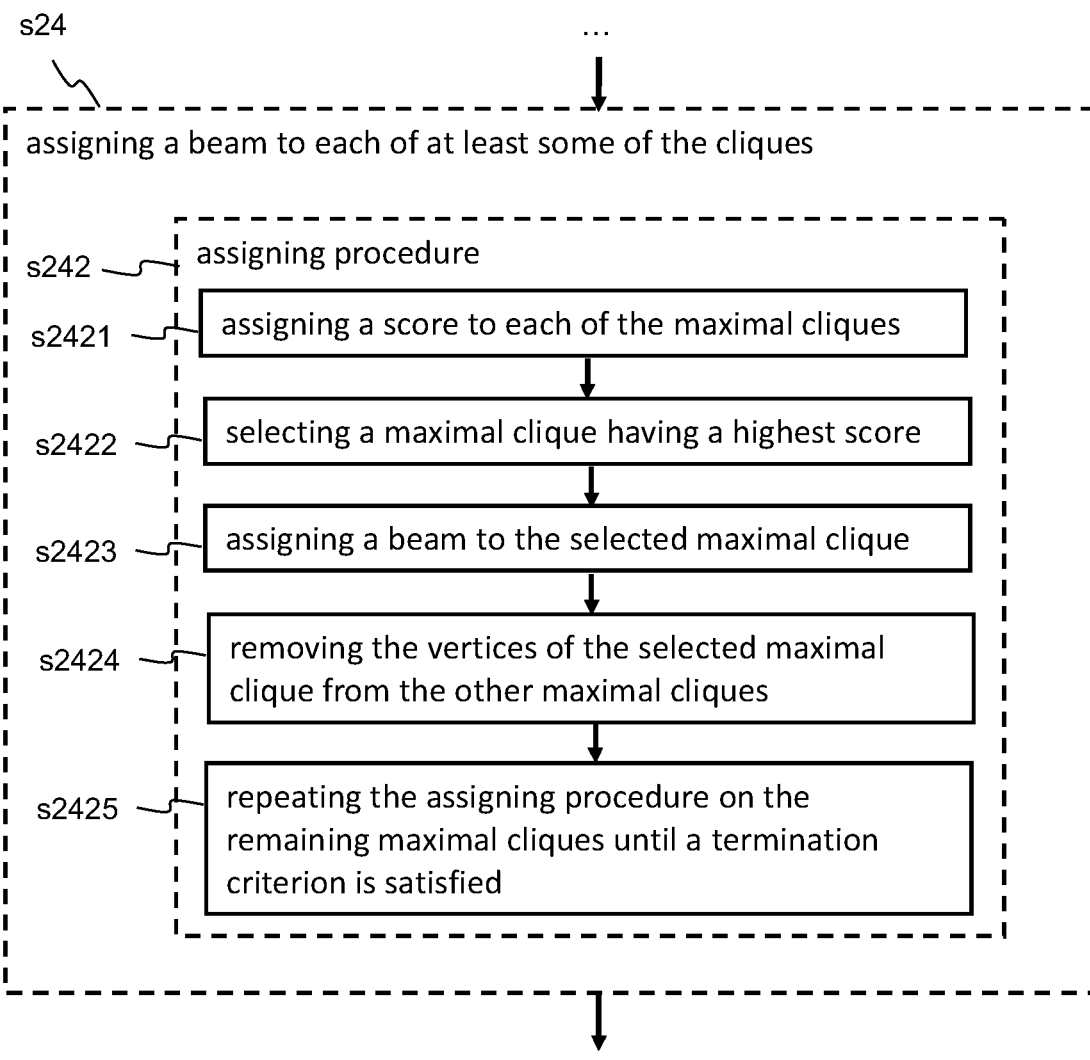
FIG. 8 is a flowchart of a portion of a method in one embodiment of the invention, showing an exemplary assignment procedure for assigning beams to cliques.

FIG. 8 is a flowchart of a portion of method in one embodiment of the invention, illustrating an assignment procedure s242 for assigning s24 beams to each of at least some of the maximal cliques. Assignment procedure s242 comprises the following steps, referred to as s2421 to s2425:

In step s2421, a score is assigned to each of the maximal cliques according to a scoring criterion. In one embodiment, the scoring criterion is based the size of the maximal clique, i.e. the largest the size, the highest the score. Other, more elaborate scoring criteria may be used however. A first example is a scoring criterion favoring maximal cliques that would lead to beams having a high utilization ratio, defined for example as the sum of the throughput requirements (committed information rates) of all terminals corresponding to all vertices of a maximal clique divided by the maximum throughput of the beam. A second example is a scoring criterion favoring maximal cliques in which the vertices corresponding to the most mobile terminals are located near the center of the beam. Such a scoring criterion may assist in minimizing the need to handoff a terminal from a beam to another. A third example is a scoring criterion favoring maximal cliques having few vertices away from their center. Such a scoring criterion may assist in minimizing the number of terminals located near the beam edge, where the antenna gain is typically lower than near the beam center. These scoring criteria may be used alone or combined.

In step s2422, a maximal clique having the highest score is selected. If more than one maximal clique has the highest score, one of these maximal cliques is selected.

In step s2423, a beam is assigned to the selected maximal clique.

In step s2424, the vertices of the selected maximal clique are removed from the other maximal cliques, the other maximal cliques being hereinafter referred to as "remaining maximal cliques". The purpose of this step is to exclude overlapping cliques.

In step s2425, the assigning procedure is then repeated on the remaining maximal cliques until a termination criterion is satisfied.

In one embodiment, the termination criterion comprises: either, given a set of available beams, the available beams are exhausted, or every vertex of the undirected graph belongs to a selected maximal clique to which a beam has been assigned, or both.

FIGS. 9a to 9m schematically illustrate the application of the method of FIG. 8 to an exemplary set of cliques, with a given, exemplary set of 8 beams available from, for example, one satellite (not shown in FIGS. 9a to 9m).

Figure 9A:
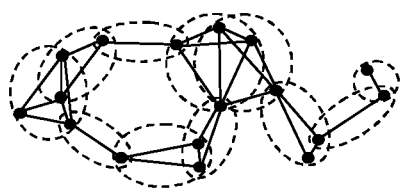
FIGS. 9a to 9m schematically illustrate the application of the method of FIG. 8 to an exemplary set of cliques.
Figure 9B:
Figure 9C:
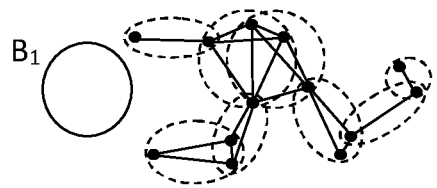
Figure 9D:
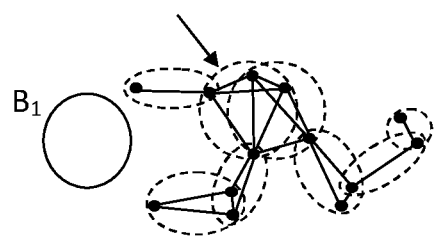

FIG. 9a shows all maximal cliques of an undirected 17-vertex, 29-edge graph: namely, three 4-vertex maximal cliques, four 3-vertex maximal cliques, and four 2-vertex maximal cliques. The highest score is assigned s2421 to the three 4-vertex maximal cliques, and one of them is selected s2422, such as the one indicated by the arrow in FIG. 9b. A beam $B_1$ is then assigned s2423 to the selected maximal clique, as shown in FIG. 9c, and the vertices of the selected maximal clique are removed s2424 from the other maximal cliques as also shown in FIG. 9c. In this first round, the two maximal cliques that were partially overlapping with the 4-vertex maximal clique to which $B_1$ has been assigned, i.e. a 3-vertex maximal clique and a 2-vertex maximal clique, both disappear because their respective, single remaining vertex no longer constitutes a maximal clique. Their single remaining vertex is already comprised in a maximal clique.

The termination criterion is not satisfied because the available 8 beams are not exhausted (one beam has been used so far), and all vertices of the undirected graph do not belong yet to a selected maximal clique to which a beam has been assigned. Therefore, assignment procedure s242 is repeated s2425.

Figure 9E:
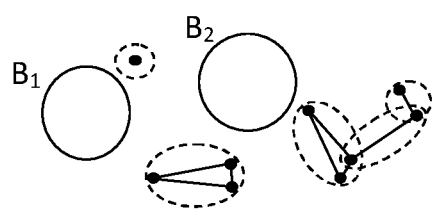
Figure 9F:
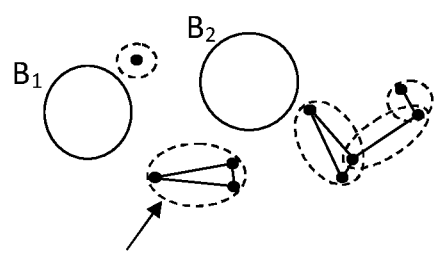

FIG. 9c shows beam $B_1$ and two 4-vertex maximal cliques, three 3-vertex maximal cliques, and three 2-vertex maximal cliques. The two 4-vertex maximal cliques are assigned s2421 the highest score, and one of them is selected s2422, such as the one indicated by the arrow in FIG. 9d. A beam $B_2$ is assigned s2423 to the selected maximal clique, as shown in FIG. 9e, and the vertices of the selected maximal clique are removed s2424 from the other maximal cliques as also shown in FIG. 9e. In this second round, the three maximal cliques that were partially overlapping with the 4-vertex maximal clique to which $B_2$ has been assigned, i.e. a 4-vertex maximal clique, a 3-vertex maximal clique, and a 2-vertex maximal clique, are affected. The 4-vertex maximal clique disappears because its single remaining vertex no longer constitutes a maximal clique, i.e. it is already comprised in a maximal clique. The 3-vertex maximal clique disappears as well because its single remaining vertex no longer constitutes a maximal clique, i.e. it is already comprised in a maximal clique. Finally, the 2-vertex maximal clique becomes a 1-vertex maximal clique, i.e. an isolated vertex, because it is not covered by any other maximal clique.

The termination criterion is not satisfied because the available 8 beams are not exhausted (two beams have been used so far), and all vertices of the undirected graph do not belong yet to a selected maximal clique to which a beam has been assigned. Therefore, assignment procedure s242 is repeated s2425.

Figure 9G:
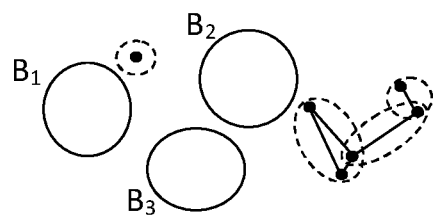
Figure 9H:
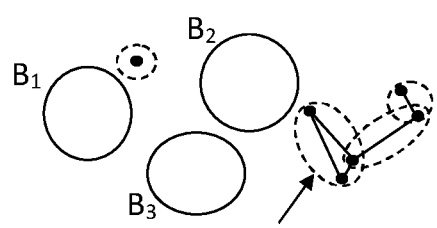

FIG. 9e shows beams $B_1$ and $B_2$ as well as two 3-vertex maximal cliques, two 2-vertex maximal cliques, and one 1-vertex maximal clique (i.e., an isolated vertex). The two 3-vertex maximal cliques are assigned s2421 the highest score, and one of them is selected s2422, such as the one indicated by the arrow in FIG. 9f. A beam $B_3$ is assigned s2423 to the selected maximal clique, as shown in FIG. 9g, and the vertices of the selected maximal clique are removed s2424 from the other maximal cliques as shown in FIG. 9g too. In this third round however, no maximal clique was overlapping with the 3-vertex maximal clique to which $B_3$ has been assigned, so that no maximal clique is affected.

The termination criterion is not satisfied because the available 8 beams are not exhausted (three beams have been used so far), and all vertices of the undirected graph do not belong yet to a selected maximal clique to which a beam has been assigned. Thus, assignment procedure s242 is repeated s2425.

Figure 9I:
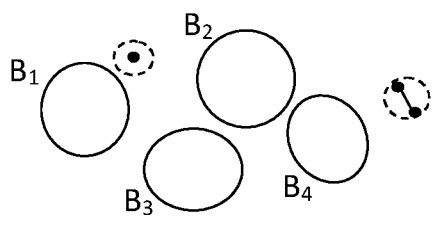
Figure 9J:
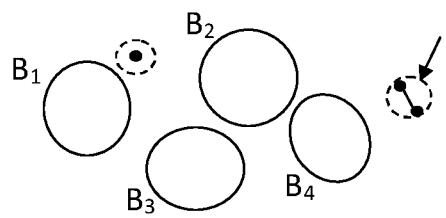

FIG. 9g shows three beams $B_1$ to $B_3$ as well as one 3-vertex maximal clique, two 2-vertex maximal cliques, and one 1-vertex maximal clique (i.e., an isolated vertex). The 3-vertex maximal clique is assigned s2421 the highest score, and is therefore selected s2422, as shows by the arrow in FIG. 9h. A beam $B_4$ is assigned s2423 to the selected maximal clique, as shown in FIG. 9i, and the vertices of the selected maximal clique are removed s2424 from the other maximal cliques as shown in FIG. 9i too. In this fourth round, one maximal clique, i.e. a 2-vertex maximal clique, was partially overlapping with the 3-vertex maximal clique to which $B_4$ has been assigned, and only that 2-vertex maximal clique is affected. The 2-vertex maximal clique disappears because its single remaining vertex no longer constitutes a maximal clique, i.e. it is already comprised in another maximal clique.

The termination criterion is not satisfied because the available 8 beams are not exhausted (four beams have been used so far), and all vertices of the undirected graph do not belong yet to a selected maximal clique to which a beam has been assigned. Thus, assignment procedure s242 is repeated s2425.

Figure 9K:
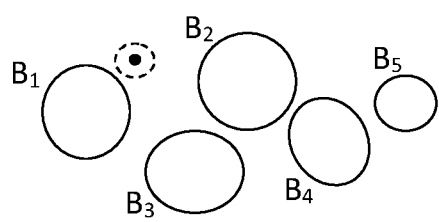
Figure 9L:
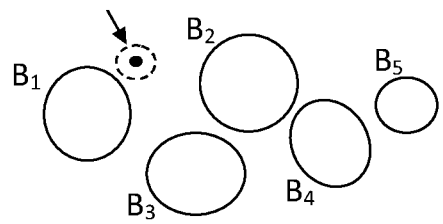

FIG. 9i shows four beams $B_1$ to $B_4$ as well as one 2-vertex maximal clique and one 1-vertex maximal clique (i.e., an isolated vertex). The 2-vertex maximal clique is assigned s2421 the highest score, is therefore selected s2422, as shown by the arrow in FIG. 9j. A beam $B_5$ is assigned s2423 to the selected maximal clique, as illustrated by FIG. 9k, and the vertices of the selected maximal clique are removed s2424 from the other maximal cliques as shown in FIG. 9k too. In this fifth round, no maximal clique was overlapping with the 2-vertex maximal clique to which $B_5$ has been assigned, so that no maximal clique is affected.

The termination criterion is still not satisfied because the available 8 beams are not exhausted (five beams have been used so far), and not all vertices have been assigned yet. Thus, assignment procedure s242 is repeated s2425.

Figure 9M:
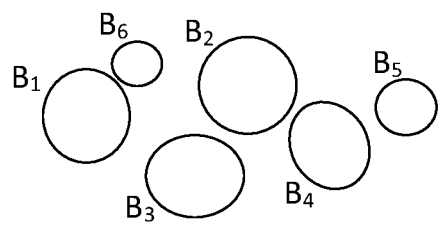

FIG. 9k shows five beams $B_1$ to $B_5$ as well as one 1-vertex maximal clique (i.e., an isolated vertex). The 1-vertex maximal clique is assigned s2421 the highest score, and is selected s2422, as shown by the arrow in FIG. 9l. Beam $B_6$ is assigned s2423 to the selected maximal clique, as illustrated by FIG. 9m, and the vertices of the selected maximal clique are removed s2424 from the other maximal cliques. In this sixth round, no other maximal clique remained. Since all vertices have been assigned, the termination criterion is satisfied, and the procedure ends. The method outputs s26 parameters indicative of the beam layout illustrated by FIG. 9m. The parameters may then be used to control the satellite to form beams $B_1$ to $B_6$.

In one embodiment, two locations are regarded as, i.e. determined to be, coverable by a single beam depending on at least one of the following measures: (i) a distance between the two locations; (ii) an angular separation between the two locations considering a beam source position; and (iii) a maximum among angular separations between the two locations considering a plurality of beam source positions.

All three measures (i), (ii), and (iii) serve to determine whether two locations are sufficiently close from each other to be covered by a single beam formed by a beam source. If two locations are sufficiently close from each other to be covered by a single beam, they are connected by an edge in the undirected graph, as discussed above. Otherwise, the two locations are not connected by an edge.

In accordance with measure (i), if a distance between two locations is smaller than a reference distance, the two locations are determined to be coverable by a single beam. The distance may for example be a geographical distance, i.e. a distance measured along the surface of the Earth, or a tunnel distance, i.e. a distance defined by a line through three-dimensional space between the two locations. The reference distance may be pre-set, i.e. set in advance of carrying out the method, and may for example depend on the capabilities of the beam sources in terms of beam generation, the beam sources' altitude, and the frequency band under consideration. In one embodiment, the reference distance is a distance selected from at least one of the following ranges: 5 to 5000 kms, 10 to 4000 kms, and 15 to 1000 kms, such as for example 10, 20, 30, 50, 60, 70, 80, 100, 200, 300, 400, 500, 600, 700, 800, 1000, 2000, 3000, or 4000 kms.

Angular separations may also be considered instead of, or in addition to, distances, to determine whether two locations are coverable by a single beam. Measures (ii) and (iii) are two examples of how this may be done.

In accordance with measure (ii), for which a single beam source is considered, if an angular distance between two locations considering a beam source position is smaller than a reference angular separation, the two locations are determined to be coverable by a single beam. The reference angular separation may be set depending on the capabilities of the beam source in terms of beam generation, and on the frequency band under consideration. Besides, if the beam source under consideration moves with respect to the Earth (e.g., a LEO or MEO satellite) during the interval of time under consideration (i.e., the desired assignment time), the beam source position leading to a maximum angular separation may be used for determining whether two locations are coverable by a single beam.

In accordance with measure (iii), for which several beam sources are considered, if a maximum among angular separations between two locations considering a plurality of beam source positions is smaller than a reference angular separation, the two locations are determined to be coverable by a single beam. As with measure (ii), the reference angular separation may be set depending on the capabilities of the beam sources in terms of beam generation, and the frequency band under consideration. Besides, if the beam sources under consideration move with respect to the Earth (e.g., LEO or MEO satellites) during the interval of time under consideration (i.e., the desired assignment time), the angular separations may be calculated at several satellite positions during said interval of time. Then, the maximum of these potential angular separations may be used for determining whether two locations are coverable by a single beam.

In one embodiment, the process of assigning s24 beams to cliques takes at least one of the following constraints into account: (a) a maximum number of beams per beam source; (b) a beam shape constraint; (c) a power limitation constraint (for a beam); (d) a constraint in terms of frequency spectrum available (for a beam), i.e. available total throughput of a beam; and (e) a constraint in terms of bandwidth requirements of terminals, i.e. sum of the committed throughput for each of the terminals. The information associated with these constraints may for example be obtained from a database, which an operator may have created during the initial service implementation and may later update if necessary.

Regarding constraint (a), if a maximum number of beams associated to a first beam source have been assigned to cliques in a given region, a further beam cannot be assigned to a further clique in that region. To address that situation, a beam associated to a second, neighbouring beam source may be assigned to the further clique, and, if necessary considering the position of the second beam source with respect to the location of the further clique, the further clique may be split so that the second beam source can serve it.

If any of constraints (b) to (e) is not met for a clique, a clique may be split. For example, if the clique is longer (along the north-south direction) than wider (in the west-east direction), it may be split into two cliques by latitude. Conversely, if the clique is wider than longer, it may be split into two cliques by longitude.

In one embodiment, instead of applying a constraint as part of assigning step s24, the application of the constraint is integrated into the clique problem resolution technique as part of step s22. For example, rather than searching for maximal cliques, cliques with a number of vertices no larger than a reference number of vertices may be identified. Doing so may reflect a limitation that a beam cannot serve more than a given number of terminals, as this otherwise may cause the frequency spectrum available for the beam to be exhausted. As another example, each vertex of an undirected graph may be assigned a weight associated with the bandwidth requirement of the terminal corresponding to the vertex location, and cliques comprising a set of vertices whose sum of weights is not exceeding a reference weight may be identified. The reference weight may reflect a limitation in terms of frequency spectrum available to a beam.

In one embodiment, the method is repeated over time to take the changes in location of mobile terminals into account. This enables a dynamic beam layout that accounts for the movement of the terminals. Namely, the method comprises repeating the steps of grouping s22 the plurality of locations into cliques, assigning s24 a beam to each of at least some of the cliques, and outputting s26 parameters. The steps may be repeated at a given frequency, such as every 30 seconds, 1 minute, 5 minutes, 10 minutes, 20 minutes, or 30 minutes. The steps may alternatively, or additionally, be repeated depending on a trigger criterion being satisfied. For example, when the processing device or processing devices detect that a terminal is about to move outside the coverage area of a beam, i.e. when a handover is about to occur, the method may be repeated to update the beam placement layout. The adjustment of the beam layout as a result of carrying out the method may therefore be performed in real-time and automatically, i.e. without the intervention of the human operator.

A dynamic beam layout adjustment as described above, i.e. in accordance with an embodiment of the invention, may lead under certain circumstances to a beam following a group of terminals moving roughly in the same direction, as if the beam was intentionally tracking the group of terminals (although the beam movement results from the repeated application of the above-described clique-based method). Terminals attached to passenger airliners may show such kind of pattern. For example, on a typical day, a number of passenger airliners leave the United States late in the afternoon all flying towards airports in Europe. A clique-based dynamic beam layout adjustment is particularly advantageous in such a situation, to automatically concentrate the satellite capacity onto regions of high bandwidth demand. More generally, this illustrates the advantages of a clique-based dynamic beam layout adjustment to serve a non-homogeneous distribution of terminals over coverage areas and time.

In one embodiment, all the beam sources used in the system or at least some of them are moving with respect to the Earth. For example, satellites orbiting in a non-geostationary orbit (NGSO), such as for example a LEO or MEO, move with respect to the Earth. To address this situation, all beams of a first beam source may be transparently taken over at one point in time by a second beam source. Alternatively, a new iteration of the method—as explained above—may be performed at regular intervals to recompute an appropriate beam placement layout.

In one embodiment, a preliminary grouping procedure may be applied, as part of step s22 or prior thereto, to reduce the number of vertices used in the clique problem resolution technique. For example, the coordinates of each vertex may be rounded to the nearest degree (degree of latitude and/or degree of longitude), the nearest 0.5 degree, the nearest 0.25 degree, or another suitable value, which may be selected based on the desired level of grouping. Such a preliminary grouping may ensure that there is a maximum number of unique vertex positions to be grouped using the clique problem resolution technique. This reduced number of vertices may in turn reduce the computation time and resources needed to execute the clique problem resolution technique on the inputted vertices and edges.

In one embodiment, after generating a beam placement layout (i.e., after steps s22 and s24), a transmission resource (e.g., in terms of frequency, time slot, code, and/or polarization) and/or a power level may be assigned to each of the locations within a beam, for the downlink transmission, the uplink transmission, or both. In that context, the power level may notably be adjusted to balance out differences between terminals at beam center and at beam edge. This resource and/or power allocation process may be fully independent from the steps of grouping s22 and assigning s24.

FIG. 10 is a flowchart of a method in one embodiment of the invention, wherein the plurality of locations on Earth correspond to locations of terminals on Earth or near the Earth's surface, and the method further comprises, prior to grouping s22 the plurality of locations into cliques, obtaining s21 information about the locations of the terminals. For fixed terminals, that information may for example be obtained from a database, which an operator may have created during the initial service implementation. For a mobile terminal, information about its location (e.g. real-time GPS status) may for example be regularly transmitted from the terminal to the processing device(s) in charge of steps s22, s24, and s26 by means of a message, i.e. a set of bits forming a packet which can be transmitted over a communication network. The location information may also be transmitted through a series of packets. The location information may for example be transmitted in an IP packet. Further, the information may be transmitted through one or more intermediate network nodes, such as for example nodes of a cellular access network or packet core network in a mobile or fixed communication network, or through a satellite. Information about the location of the mobile terminal may as well be predicted (route prediction).

Figure 14:
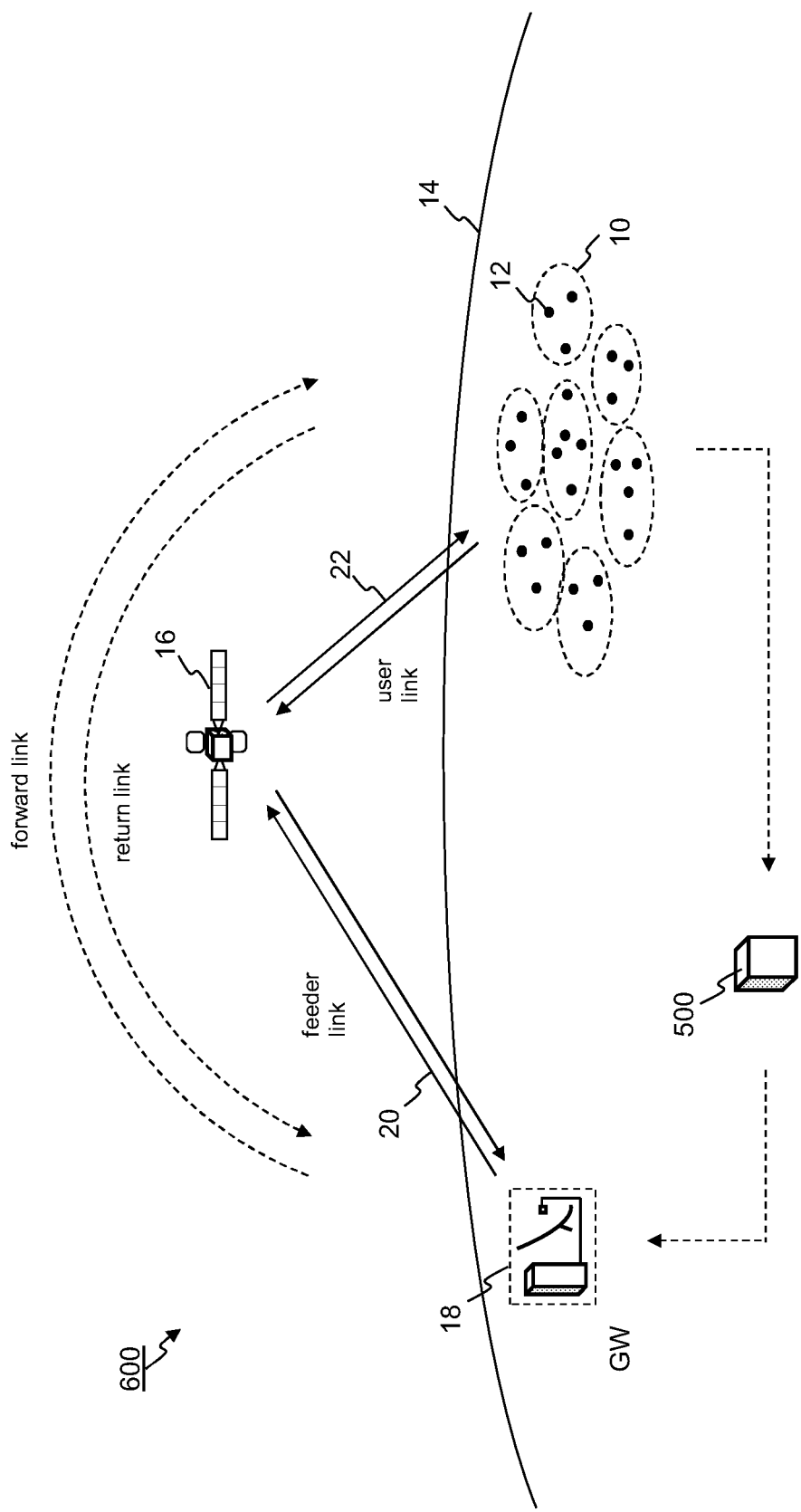
FIG. 14 schematically illustrates a system comprising a gateway, a satellite, a plurality of locations on Earth, and a processing device or set of processing devices for assisting in placing beams to cover the locations, in one embodiment of the invention.

FIG. 11 is a flowchart of a method in one embodiment of the invention, the method being further carried out by a terminal. The method further comprises transmitting s20, from the terminal, information about its location to the processing device(s) in charge of steps s22, s24, and s26. The transmission of the location information is schematically illustrated in FIG. 14 by the dashed arrow from locations 12 towards processing device(s) 500. However, as mentioned above, the location information may alternatively be transmitted by the terminals through user link 22, satellite 16, feeder link 20, gateway 18, and then processing device(s) 500.

Figure 12:
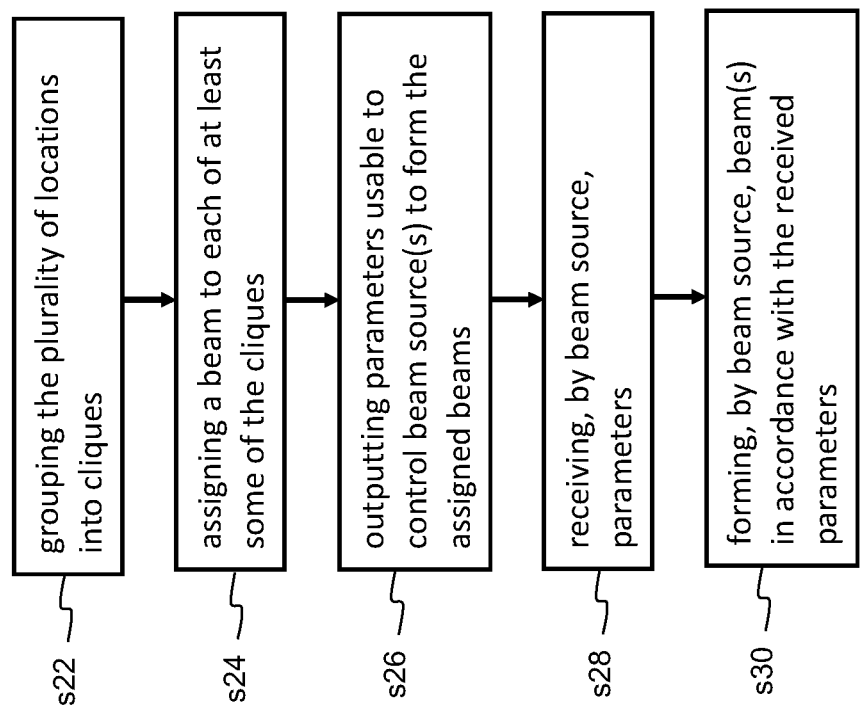
FIG. 12 is a flowchart of a method in one embodiment of the invention, further comprising a beam source receiving parameters usable for forming one or more beam, and then forming the beam(s) based thereon.

FIG. 12 is a flowchart of a method in one embodiment of the invention, the method being further carried out by a beam source 16. The method further comprises the beam source receiving s28 parameters usable for forming one or more beam, after which the beam source forms s30, i.e. generates, the beam(s) in accordance with the received parameters. The exemplary transmission of the parameters from processing device(s) 500 to a satellite 16 acting as beam source is schematically illustrated in FIG. 14 by the dashed arrow from processing device(s) 500 to gateway 18 and then by the plain arrow from gateway 18 to satellite 16 through feeder link 20.

Figure 13:
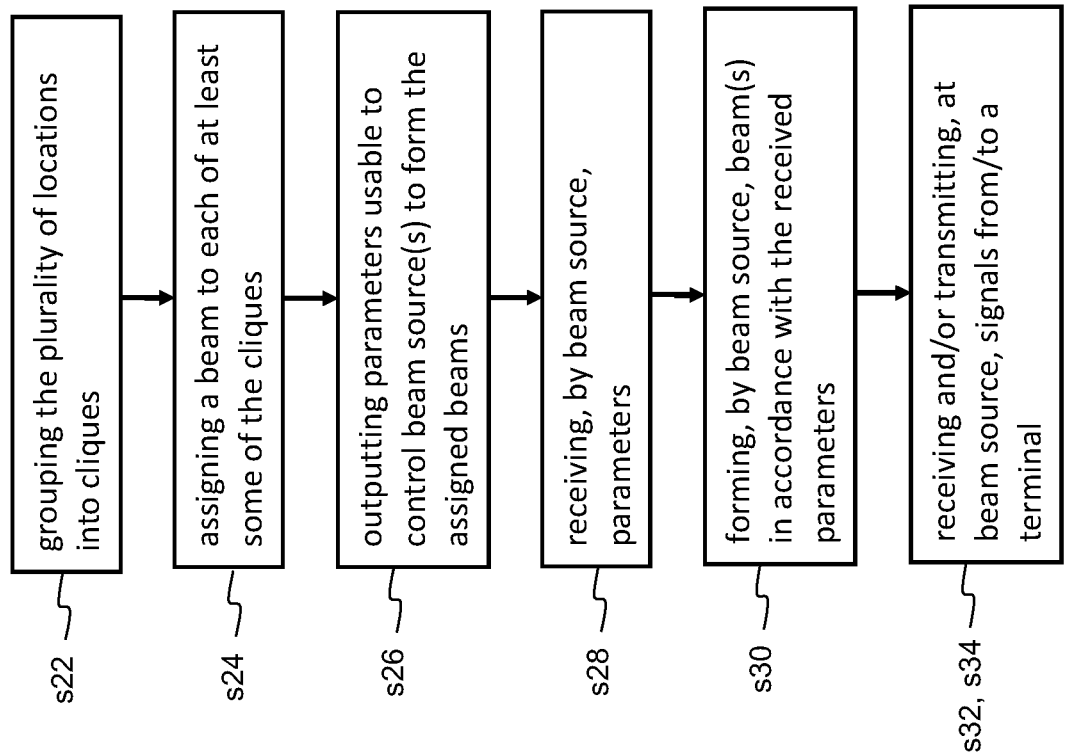
FIG. 13 is a flowchart of a method in one embodiment of the invention, further comprising a beam source receiving and/or transmitting signals from and/or to a terminal.

FIG. 13 is a flowchart of a method in one embodiment of the invention, further comprising the beam source 16 receiving s32 and/or transmitting s34 signals from and/or to a terminal at a location corresponding to one of the plurality of locations. When covered by a beam formed by a beam source, a terminal therefore also benefits from the method by being able to receive and/or transmit signals to the beam source. Therefore, thanks to the method, broadband communications, such as internet connectivity, may for example be provided to a plurality of terminals.

In one embodiment in which the method is repeated over time (to take changes in location of terminals into account), the following operations are additionally performed: If the beams assigned in step s24 do not cover some of the input locations, i.e. whenever the process fails to assign a beam to a terminal (for example because there are not enough beams to cover geographically spread-out terminals), the processing device(s) automatically generate(s) and send(s) one or more alert messages (e.g. emails) so that the terminals' operators are warned ahead of time (i.e., ahead of performing step s30 to realize the new beam layout) that the terminals will lose their link soon.

FIG. 14 schematically illustrates a system 600 comprising a gateway 18, a satellite 16, a plurality of locations 12 on Earth, and a processing device 500 or set of processing devices for assisting in placing beams 10 to cover the plurality of locations 12 on Earth 14, in one embodiment of the invention. In one embodiment, processing device(s) 500 is/are integrated into and/or collocated with gateway 18. Besides, as apparent from FIGS. 3 to 5 and the description relating thereto, more than one beam source may be used and other beam sources then satellites may be used.

Figure 2:
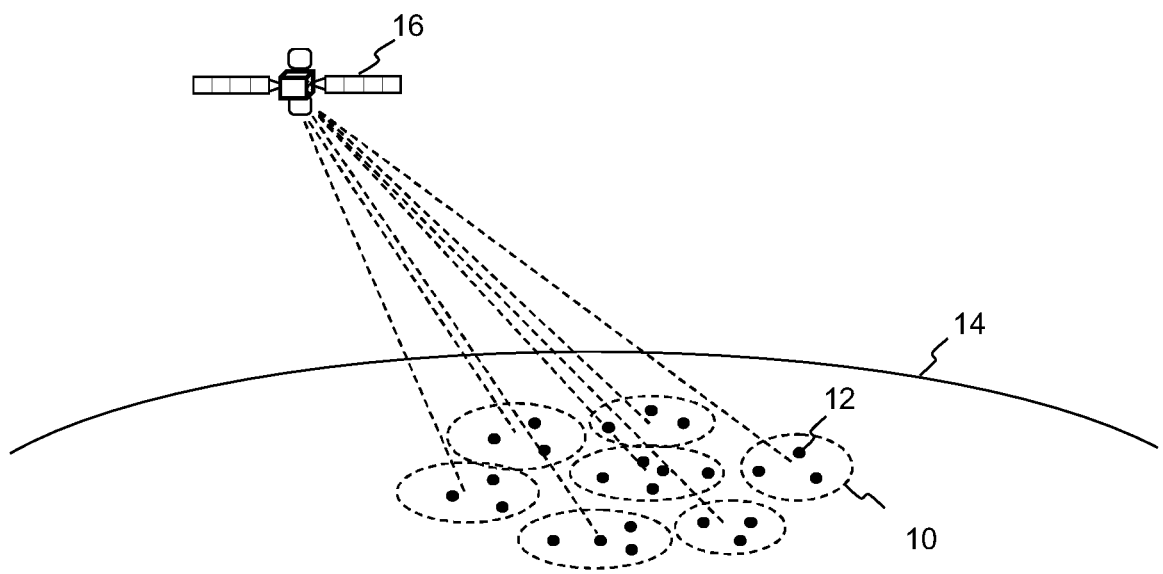
FIG. 2 schematically illustrates some aspects of a multi-beam satellite communications method and system in one embodiment of the invention.
Figure 3:
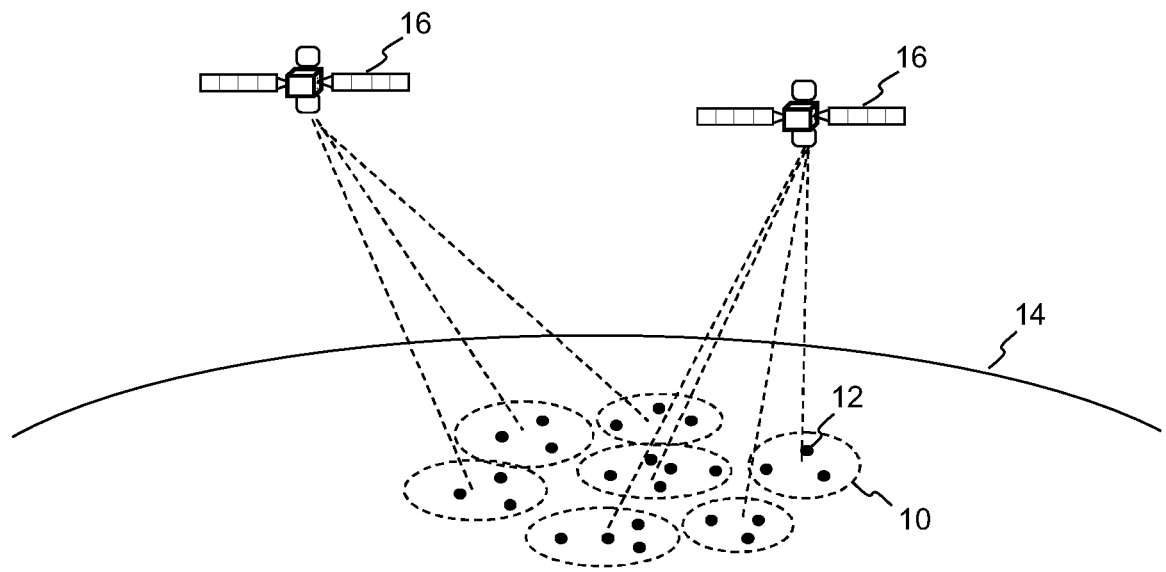
FIG. 3 schematically illustrates some aspects of a multi-beam satellite communications method and system in one embodiment of the invention, wherein two satellites are used to cover a plurality of locations on Earth.
Figure 15:
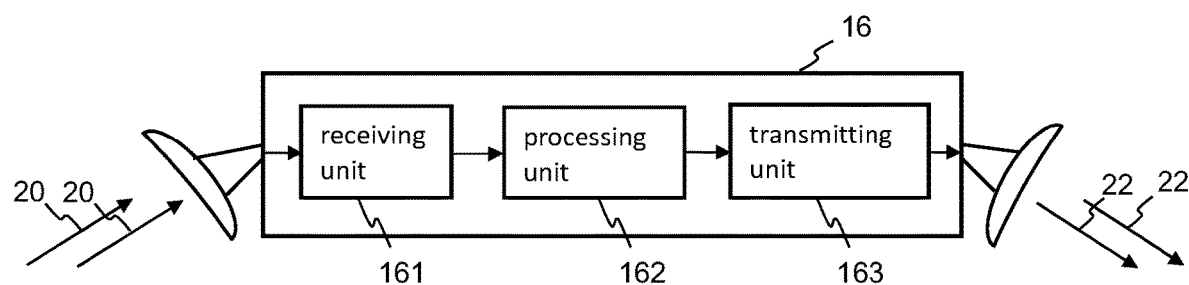
FIG. 15 schematically illustrates a satellite in one embodiment of the invention.

FIG. 15 schematically illustrates some components of a satellite 16 in one embodiment of the invention, which may be used in a system such as one illustrated by FIG. 2, 3, or 14. In particular, satellite 16 is configured for enabling communication from at least one gateway 18 to satellite 16 over one or more uplink channels 20 and then from satellite 16 towards a plurality of non-space-based receiver locations 12 (where terminals may be located), wherein satellite 16 is configured to transmit towards Earth 14 in a plurality of beams 10. Satellite 16 comprises a receiving unit 161, a processing unit 162, and a transmitting unit 163. Receiving unit 161 is configured for receiving uplink signals from gateway(s) 18 over uplink channel(s) 20. Processing unit 162 configured for deriving downlink signals from the uplink signals. In one embodiment, processing unit 162 is a digital transparent processor (DTP). A DTP may be defined as a device on-board a satellite that provides multiple input ports for analog uplink signals and multiple output ports for analog downlink signals, and that performs frequency conversion (and/or polarization conversion) and level adjustment for selected parts of the frequency band between selected pairs of input and output ports. Digital processing is advantageous in that techniques such as the fast Fourier transform (FFT) or polyphase filter bank (PFB) techniques, which split up signals into slices of the frequency band, may be used. Besides, transmitting unit 163 is configured for transmitting the downlink signals towards Earth 14. Satellite 16 is configured so that, and in particular receiving unit 161, processing unit 162, and transmitting unit 163 are configured so that, in operation, the beams are formed in accordance with parameters received from processing device(s) 500.

Figure 16:
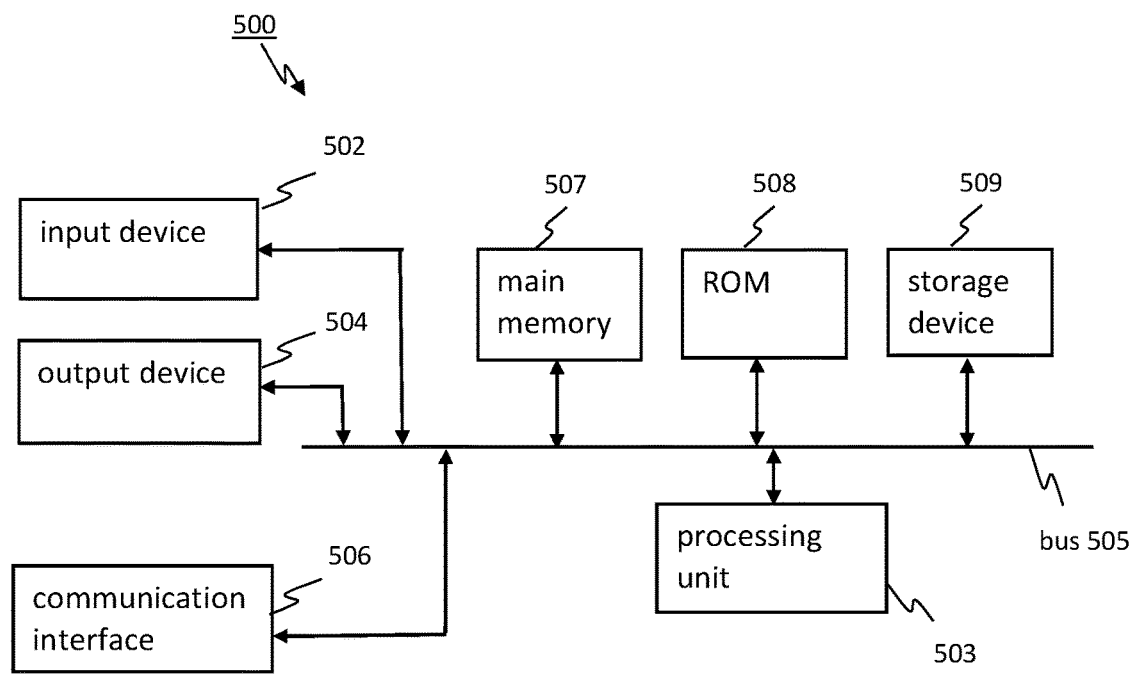
FIG. 16 is a schematic diagram of an exemplary implementation of a processing device in one embodiment of the invention.
Figure 17:
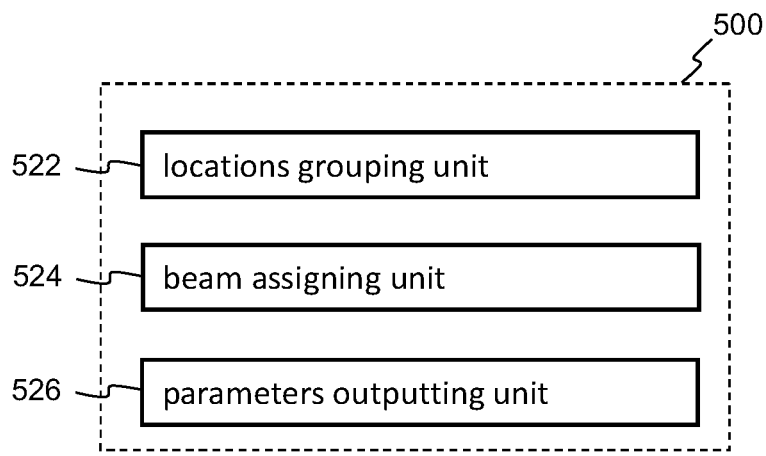
FIG. 17 schematically illustrates a system comprising a processing device or set of processing devices for assisting in placing beams to cover a plurality of locations on Earth, in one embodiment of the invention.
Figure 19:
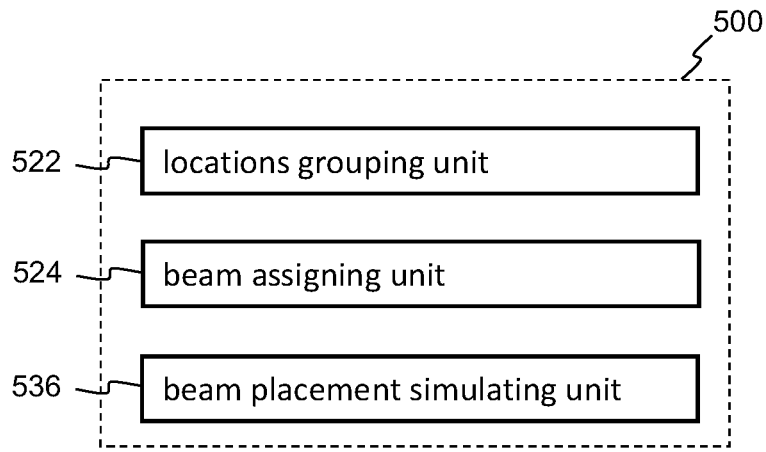
FIG. 19 schematically illustrates a system notably comprising a beam placement stimulating unit in one embodiment of the invention.

FIG. 16 is a schematic diagram of an exemplary implementation of a processing device 500 that may be used in embodiments of the invention. Namely, processing device 500, such as one as schematically illustrated by FIG. 17 or 19, may be implemented using elements such as schematically illustrated by FIG. 16.

Namely, processing device 500 may include a bus 505, a processing unit 503, a main memory 507, a ROM 508, a storage device 509, an input device 502, an output device 504, and a communication interface 506. Bus 505 may include a path that permits communication among the components of processing device 500.

Processing unit 503 may include a processor, a microprocessor, or processing logic that may interpret and execute instructions. Main memory 507 may include a RAM or another type of dynamic storage device that may store information and instructions for execution by processing unit 503. ROM 508 may include a ROM device or another type of static storage device that may store static information and instructions for use by processing unit 503. Storage device 509 may include a magnetic and/or optical recording medium and its corresponding drive.

Input device 502 may include a mechanism that permits a user to input information to processing device 500, such as a keypad, a keyboard, a mouse, a pen, voice recognition and/or biometric mechanisms, etc. Output device 504 may include a mechanism that outputs information to the user, including a display, a printer, a speaker, etc. Communication interface 506 may include any transceiver-like mechanism, or receiver and transmitter, that enables processing device 500 to communicate with other devices and/or systems (such as with a gateway 18). For example, communication interface 506 may include mechanisms for communicating with another device or system via a telecommunication network.

Processing device 500 may perform certain operations or processes described herein. These operations may be performed in response to processing unit 503 executing software instructions contained in a computer-readable medium, such as main memory 507, ROM 508, and/or storage device 509. A computer-readable medium may be defined as a physical or a logical memory device. For example, a logical memory device may include memory space within a single physical memory device or distributed across multiple physical memory devices. Each of main memory 507, ROM 508 and storage device 509 may include computer-readable media. The magnetic and/or optical recording media (e.g., readable CDs or DVDs) of storage device 509 may also include computer-readable media. The software instructions may be read into main memory 507 from another computer-readable medium, such as storage device 509, or from another device via communication interface 506.

The software instructions contained in main memory 509 may cause processing unit 503 to perform operations or processes described herein, such as steps s22, s24, s26, and s36. Alternatively, hardwired circuitry may be used in place of or in combination with software instructions to implement processes and/or operations described herein. Thus, implementations described herein are not limited to any specific combination of hardware and software.

FIG. 17 schematically illustrates a system comprising a processing device 500 or set of processing devices for assisting in placing beams to cover a plurality of locations on Earth, in one embodiment of the invention. Processing device 500 may be configured for performing the method as described with reference to FIG. 1. To do so, it may for example comprise a locations grouping unit 522, a beam assigning unit 524, and a parameters outputting unit 526. Locations grouping unit 522 is configured for grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam. Beam assigning unit 524 is configured for assigning a beam to each of at least some of the cliques. Parameters outputting unit 526 is configured for outputting parameters usable to control at least one beam source to form the assigned beams.

Figure 18:
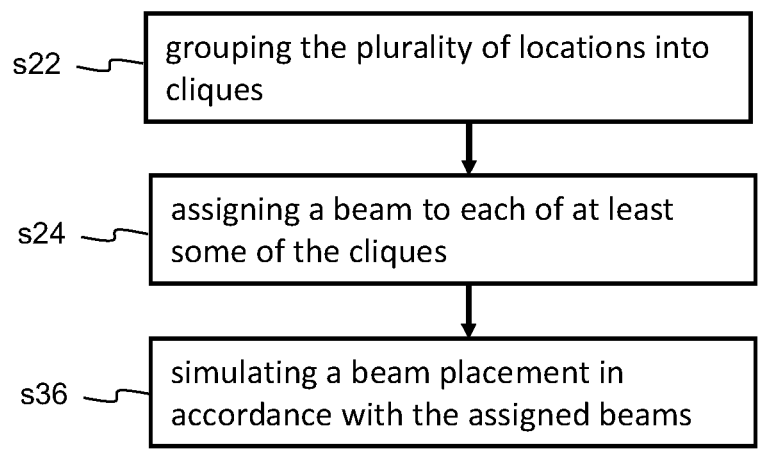
FIG. 18 is a flowchart of a method comprising a step of simulating a beam placement in one embodiment of the invention.

FIG. 18 is a flowchart of a method in one embodiment of the invention, which differs from the method described with reference to FIG. 1 in that, after assigning s24 a beam to each of at least some of the cliques, a beam placement is simulated s36 in accordance with the assigned beams. That is, the effects of a specific beam placement may be simulated to provide for realistic prediction of the performance of the designed system (i.e., beam source(s), beams, terminals, and communications between beam source(s)) before deploying the system. For example, the simulation may be used to validate, i.e. to determine the feasibility of, changes in constellation designs (e.g., the number of beam sources), to check future coverage of existing terminals and bandwidths, to validate adding one or more new terminals, to validate increases in one or more terminals' bandwidth, to analyse the impact of itinerary changes on the system, and other hypothetical scenarios.

In one embodiment, step s36 outputs and/or displays (on a screen or the like): (a) an image showing a map of a region of the Earth superimposed with the plurality of locations and the assigned beams; or (b) a video showing a map of a region of the Earth superimposed with the plurality of locations (fixed terminals, or mobile terminals following a previously inputted route, i.e. an itinerary) and the assigned beams over time. Together with the video, additional indicators may also be provided (e.g. outputted or displayed) such as one or more of:

a. a label associated with each of the terminals (e.g. the name of the ship or airplane to which the terminal is attached);

b. a label associated with each of the beams (e.g. indicating the name of the beam source from which the beam is formed);

c. the percentage of time each terminal is assigned to a beam;

d. the number of beam changes each terminal experienced;

e. the expected data rate for each terminal, including times when it was expected to fall below a minimum threshold; and f. the number of beams required over time, or as a histogram or probability density function.

FIG. 19 schematically illustrates a system comprising a processing device or set of processing devices for assisting in placing beams to cover a plurality of locations on Earth in one embodiment of the invention, which differs from the system described with reference to FIG. 17 in that, in addition to or instead of the parameters outputting unit 526, the system is configured for simulating a beam placement in accordance with the assigned beams. To do so, it may comprise a beam placement simulating unit 536 configured for simulating a beam placement in accordance with the assigned beams.

Where the terms "receiving unit" 161, "processing unit" 162, "transmitting unit" 163, "locations grouping unit" 522, "beam assigning unit" 524, "parameters outputting unit" 526, "beam placement simulating unit" 536, etc. are used herewith, no restriction is made regarding how distributed these elements may be and regarding how gathered elements may be. That is, the constituent elements thereof may be distributed in different software or hardware components or devices for bringing about the intended function. A plurality of distinct elements may also be gathered for providing the intended functionalities.

Any one of the above-referred elements or functions of a processing device, a gateway, a satellite, or a terminal may be implemented in hardware, software, field-programmable gate array (FPGA), application-specific integrated circuit (ASIC), and/or firmware, or the like.

In further embodiments of the invention, any one of the above-mentioned receiving unit 161, processing unit 162, transmitting unit 163, locations grouping unit 522, beam assigning unit 524, parameters outputting unit 526, beam placement simulating unit 536, etc. is replaced by receiving means 161, processing means 162, transmitting means 163, locations grouping means 522, beam assigning means 524, parameters outputting means 526, beam placement simulating means 536, etc. respectively, or, by a receiver 161, processor 162, transmitter 163, locations grouper 522, beam assigner 524, parameters outputter 526, beam placement simulator 536, etc. for performing the functions of the above-mentioned receiving unit 161, processing unit 162, transmitting unit 163, locations grouping unit 522, beam assigning unit 524, parameters outputting unit 526, beam placement simulating unit 536, etc.

In further embodiments of the invention, any one of the above-described steps or processes may be implemented using computer-executable instructions, for example in the form of computer-executable procedures, methods or the like, in any kind of computer languages, and/or in the form of embedded software on firmware, integrated circuits or the like.

Although the present invention has been described based on detailed examples, the examples only serve to provide the skilled person with a better understanding and are not intended to limit the scope of the invention. The scope of the invention is defined by the appended claims.

ABBREVIATIONS

ASIC application-specific integrated circuit
C/N carrier-to-noise ratio
dB decibel
DTP digital transparent processor
FFT fast Fourier transform
GSO geosynchronous orbit
HALE high-altitude long endurance
HAPS high-altitude platform station
LEO low Earth orbit
MEO medium Earth orbit
NGSO non-geostationary orbit
PFB polyphase filter bank
RAM random-access memory
ROM read-only memory

The invention claimed is:

1. A method, carried out by a processing device or a set of processing devices, for assisting in placing beams to cover a plurality of locations on Earth, the method comprising:
grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam;
assigning a beam to each of at least some of the cliques; and
outputting parameters usable to control at least one beam source to form the assigned beams; wherein:
grouping the plurality of locations into cliques by applying a clique problem resolution technique comprises one of:
identifying maximal cliques of the undirected graph;
identifying cliques with a number of vertices no larger than a reference number of vertices; and
assigning, to each vertex of the undirected graph, a weight associated with a bandwidth requirement corresponding to the vertex's location, and identifying cliques comprising a set of vertices whose sum of weights is not exceeding a reference weight; and
wherein assigning a beam to each of at least some of the cliques comprises taking at least two of the following constraints into account:
a maximum number of beams per beam source;
a beam shape constraint;
a power limitation constraint;
a constraint in terms of frequency spectrum available; and
a constraint in terms of bandwidth requirements of terminals.

2. The method of claim 1, wherein each beam source is a satellite or an aircraft.

3. The method of claim 2, wherein the aircraft is at least one of: a high-altitude platform station, a high-altitude long endurance aircraft, an aerostat, a balloon, an airship, an airplane, and an unmanned aerial vehicle.

4. The method of claim 1, wherein the clique problem resolution technique comprises a Bron-Kerbosch technique.

5. The method of claim 1, wherein grouping the plurality of locations into cliques by applying a clique problem resolution technique comprises identifying maximal cliques of the undirected graph, and wherein assigning a beam to each of at least some of the cliques comprises:
assigning a beam to each of at least some of the maximal cliques.

6. The method of claim 1, wherein two locations are regarded as coverable by a single beam depending on at least one of:
a distance between the two locations;
an angular separation between the two locations considering a beam source position; and
a maximum among angular separations between the two locations considering a plurality of beam source positions.

7. The method of claim 1, further comprising repeating the steps of grouping the plurality of locations into cliques, assigning a beam to each of at least some of the cliques, and outputting parameters.

8. The method of claim 7, wherein repeating the steps comprises at least one of:
regularly repeating said steps, and
repeating said steps depending on a trigger criterion being satisfied.

9. The method of claim 1, wherein the plurality of locations on Earth correspond to locations of terminals on Earth or near the Earth's surface, and the method further comprises, prior to grouping the plurality of locations into cliques:
obtaining information about the locations of the terminals.

10. The method of claim 9, the method being further carried out by a terminal, wherein the method further comprises:
transmitting, from the terminal, information about its location so that the processing device or set of processing devices, whichever is applicable, obtain said information.

11. The method of claim 1, the method being further carried out by a beam source, wherein the method further comprises:
receiving, by the beam source, parameters usable for controlling the beam source to form at least one beam; and
forming, by the beam source, the at least one beam in accordance with the received parameters.

12. The method of claim 11, further comprising at least one of:
receiving, by the beam source, signals from a terminal at a location corresponding to one of the plurality of locations; and
transmitting, by the beam source, signals to a terminal at a location corresponding to one of the plurality of locations.

13. A system for assisting in placing beams to cover a plurality of locations on Earth, the system comprising a processing device or set of processing devices, and the system being configured for:
grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam;
assigning a beam to each of at least some of the cliques; and
outputting parameters usable to control at least one beam source to form the assigned beams; wherein:
grouping the plurality of locations into cliques by applying a clique problem resolution technique comprises one of:
identifying maximal cliques of the undirected graph;
identifying cliques with a number of vertices no larger than a reference number of vertices; and
assigning, to each vertex of the undirected graph, a weight associated with a bandwidth requirement corresponding to the vertex's location, and identifying cliques comprising a set of vertices whose sum of weights is not exceeding a reference weight; and
wherein assigning a beam to each of at least some of the cliques comprises taking at least two of the following constraints into account:
a maximum number of beams per beam source;
a beam shape constraint;
a power limitation constraint;
a constraint in terms of frequency spectrum available; and
a constraint in terms of bandwidth requirements of terminals.

14. The system of claim 13, wherein each beam source is one of a satellite and an aircraft.

15. The system of claim 14, wherein the aircraft is at least one of: a high-altitude platform station, a high-altitude long endurance aircraft, an aerostat, a balloon, an airship, an airplane, and an unmanned aerial vehicle.

16. The system of claim 15, wherein the clique problem resolution technique comprises a Bron-Kerbosch technique.

17. The system of claim 15, wherein grouping the plurality of locations into cliques by applying a clique problem resolution technique comprises identifying maximal cliques of the undirected graph, and wherein assigning a beam to each of at least some of the cliques comprises:
assigning a beam to each of at least some of the maximal cliques.

18. The system of claim 13, wherein two locations are regarded as coverable by a single beam depending on at least one of:
a distance between the two locations;
an angular separation between the two locations considering a beam source position; and
a maximum among angular separations between the two locations considering a plurality of beam source positions.

19. The system of claim 13, further configured for repeating the steps of grouping the plurality of locations into cliques, assigning a beam to each of at least some of the cliques, and outputting parameters.

20. The system of claim 19, wherein repeating the steps comprises at least one of:
regularly repeating said steps, and
repeating said steps depending on a trigger criterion being satisfied.

21. The system of claim 13, wherein the plurality of locations on Earth correspond to locations of terminals on Earth or near the Earth's surface, and the system is further configured for, prior to grouping the plurality of locations into cliques:
obtaining information about the locations of the terminals.

22. The system of claim 21, the system further comprising a terminal, wherein the terminal is configured for:
transmitting information about its location so that the processing device or set of processing devices, whichever is applicable, obtain said information.

23. The system of claim 13, the system further comprising a beam source, wherein the beam source is configured for:
receiving parameters usable for controlling the beam source to form at least one beam; and
forming the at least one beam in accordance with the received parameters.

24. The system of claim 23, wherein the beam source is further configured for:
receiving signals from a terminal at a location corresponding to one of the plurality of locations; and
transmitting signals to a terminal at a location corresponding to one of the plurality of locations.

25. A non-transitory computer readable storage medium storing computer program or a set of computer programs comprising computer-readable instructions configured, when executed on a computer or set of computers, to cause the computer or set of computers to carry out the method of claim 1.

26. A method, carried out by a processing device or a set of processing devices, for assisting in placing beams to cover a plurality of locations on Earth, the method comprising:
grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam;
assigning a beam to each of at least some of the cliques; and
simulating a beam placement in accordance with the assigned beams; wherein:
grouping the plurality of locations into cliques by applying a clique problem resolution technique comprises one of:
identifying maximal cliques of the undirected graph;
identifying cliques with a number of vertices no larger than a reference number of vertices; and
assigning, to each vertex of the undirected graph, a weight associated with a bandwidth requirement corresponding to the vertex's location, and identifying cliques comprising a set of vertices whose sum of weights is not exceeding a reference weight; and wherein assigning a beam to each of at least some of the cliques comprises taking at least two of the following constraints into account:
  a maximum number of beams per beam source;
  a beam shape constraint;
  a power limitation constraint;
  a constraint in terms of frequency spectrum available; and
  a constraint in terms of bandwidth requirements of terminals.

27. A system for assisting in placing beams to cover a plurality of locations on Earth, the system comprising a processing device or set of processing devices, and the system being configured for:
  grouping the plurality of locations into cliques by applying a clique problem resolution technique to an undirected graph whose vertices correspond to the plurality of locations and wherein two vertices of the undirected graph are connected by an edge if they correspond to two locations that are regarded as coverable by a single beam;
  assigning a beam to each of at least some of the cliques; and
  simulating a beam placement in accordance with the assigned beams; wherein:
  grouping the plurality of locations into cliques by applying a clique problem resolution technique comprises one of:
    identifying maximal cliques of the undirected graph;
    identifying cliques with a number of vertices no larger than a reference number of vertices; and
    assigning, to each vertex of the undirected graph, a weight associated with a bandwidth requirement corresponding to the vertex's location, and identifying cliques comprising a set of vertices whose sum of weights is not exceeding a reference weight; and
  wherein assigning a beam to each of at least some of the cliques comprises taking at least two of the following constraints into account:
    a maximum number of beams per beam source;
    a beam shape constraint;
    a power limitation constraint;
    a constraint in terms of frequency spectrum available; and
    a constraint in terms of bandwidth requirements of terminals.

28. A non-transitory computer readable storage medium storing computer program or a set of computer programs comprising computer-readable instructions configured, when executed on a computer or set of computers, to cause the computer or set of computers to carry out the method of claim 26.

* * * * *